United States Patent [19]

Lagarde

[11] 4,350,883
[45] Sep. 21, 1982

[54] METHOD OF MARKING AND OF IDENTIFYING OBJECTS MARKED BY ELECTRICALLY CONDUCTING ELEMENTS

[75] Inventor: Pierre Lagarde, Versailles, France

[73] Assignee: Imphy S.A., Paris, France

[21] Appl. No.: 162,670

[22] Filed: Jun. 24, 1980

[30] Foreign Application Priority Data

Jun. 26, 1979 [FR] France ............................ 79 16351

[51] Int. Cl.³ .................. G01R 27/02; G06K 7/00; G08B 13/22
[52] U.S. Cl. ............................. 235/435; 235/492; 324/58 C; 340/561
[58] Field of Search ............. 235/435, 492; 324/58 C, 324/62; 340/561

[56] References Cited

U.S. PATENT DOCUMENTS

| | | | |
|---|---|---|---|
| 1,567,325 | 12/1925 | Lasker, Jr. ........................... | 235/492 |
| 1,997,157 | 4/1935 | Tauschek ............................ | 235/492 |
| 2,774,060 | 12/1956 | Thompson ......................... | 235/492 |
| 3,281,680 | 10/1966 | Faulkner ........................... | 324/58 C |
| 3,598,968 | 8/1971 | Victor ................................ | 235/492 |
| 3,599,197 | 8/1971 | Boyko ................................ | 340/561 |
| 3,723,862 | 3/1973 | Wentzel et al. .................... | 340/561 |
| 3,803,571 | 4/1974 | Luz ..................................... | 340/561 |
| 3,953,796 | 4/1976 | Keller ................................ | 324/58 C |
| 4,220,915 | 9/1980 | Kawamoto et al. ............... | 324/62 X |

Primary Examiner—Donald J. Yusko
Attorney, Agent, or Firm—Pollock, Vande Sande & Priddy

[57] ABSTRACT

A method of marking and of identifying objects (1) which are non-conductors of electricity by inclusion of conducting masses and detection by passage through a high-frequency electromagnetic field and detection of the variation in the corresponding response signal picked up.

Metallic wires (2) each selected from a range of specimens of different electric conductivity are used as marking elements. The responses are measured which are each characteristic of one specimen and of a predetermined code value.

The invention applies to the recognition of the authenticity of cards or documents thus previously marked.

8 Claims, 4 Drawing Figures

METHOD OF MARKING AND OF IDENTIFYING OBJECTS MARKED BY ELECTRICALLY CONDUCTING ELEMENTS

BACKGROUND OF THE INVENTION

The present invention relates to a method of marking and of identifying objects which are normally non-conductors of electricity and marked by conducting elements. It is intended more particularly, by way of example, for recognizing the authenticity of documents thus previously marked and coded.

At present it is known to detect the presence of a metallic body which is a conductor of electricity in a mass or a region which normally only includes non-conducting elements. For this, a generator of high frequency electromagnetic waves is used, normally having a certain impedance. When a conducting mass, metallic for example, enters the field of emission, the eddy currents generated in the mass absorb some of the energy emitted by the generator and give rise to the emission of a reflected energy. The detection of such a response signal, or of the modification in the impedance of the system, reveals the presence of a conducting mass. Such devices are used, for example, for the detection of mines hidden in the ground, or for safety checks at airports. In all these cases, where the aim is purely qualitative, no effort is made to measure the disturbances recorded.

SUMMARY OF THE INVENTION

The present invention relates to a novel application of these detection means, with a view to effecting a coded marking of objects so as then to be able to detect them and identify the affixed code.

The invention therefore applies to a method of marking and of identifying objects which are normally non-conductors of electricity, by previous inclusion of conducting masses and subsequent detection of these masses by causing the object to pass into an electromagnetic field produced by a high-frequency generator, and revealing the variation in response of the system, which variation is due to the eddy currents then developing in the conducting mass. According to the invention, at least one metallic wire selected from a predetermined range of specimens of different electric conductivity, a code value being attributed to each specimen, is used as a marking element. Each of the regions of the object containing a wire is brought successively to be in the electromagnetic field, with the same orientation, and each recorded response is measured, each being characteristic of one specimen and of one code value, the complete code of the object then consisting of the succession of the elementary code values detected for each wire.

According to a particular form of embodiment of the invention, specimens of wires are used, the resistivity of which is variable radially, and for the detection, each of the regions containing a wire is brought successively to be in at least two electromagnetic fields of different frequency, and the response recorded for each frequency are compared.

BRIEF DESCRIPTION OF THE DRAWINGS

The invention will be better understood by referring to a particular form of embodiment given by way of example and illustrated by the accompanying drawings.

In FIG. 4, the passage of the label is parallel to the plates.

DETAILED DESCRIPTION OF AN EMBODIMENT

Figure 1:
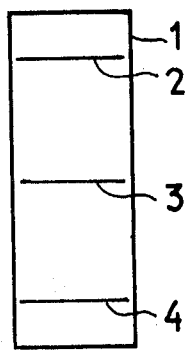
FIG. 1 illustrates diagrammatically a "label" produced according to the invention.

FIG. 1 illustrates what we shall hereinafter call an identification "label" 1, it being understood that this a very general term which may designate either an actual label of paper or of carboard, adapted to be attached to a larger object, or the object itself, e.g., a card of plastics material.

The label 1 comprises in its mass metallic wires 2, 3 and 4, introduced during its manufacture, which may be identical to one another or different, but are always selected from a predetermined range of specimens. This range of specimens includes wires of different electric resistivity, and, for example, wires of the same diameter but produced from different metals or alloys. Thus the wire 2 might be of copper with a specific resistivity of 1.8 $\mu\Omega$cm, the wire 3 of nickel with a specific resistivity of 7.2, and the wire 4 of iron-nickel alloy with 42% nickel, the resistivity of which is 63.

Figure 2:
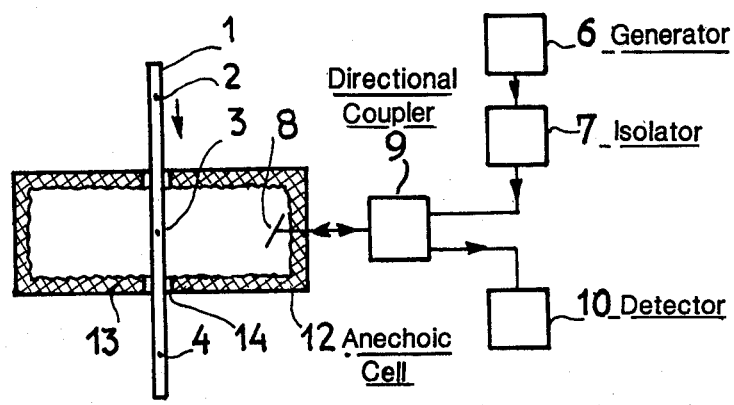
FIG. 2 is a construction diagram of a detection cell using a dipole aerial.

FIG. 2 illustrates diagrammatically a device for the detection and identification of such labels. This device consists of a sweep oscillator 6, for example a Ferisol GH 300 generator, followed by an isolator 7 adapted to prevent a return to the generator 6. The assembly is connected to a quarter-wave dipole aerial 8 through a directional coupler 9 at which an energy detector 10 likewise ends. The aerial 8 is included in an anechoic cell 12 lined internally with a material 13 which absorbs the microwaves, for example a material on a graphite base sold under the Trade Mark ECOSORB.

The cell 12 is provided with two aligned apertures 14 which can leave a passage for the label 1. The relative dimensions of the cell 12 and of the label 1 are such that a single wire 2, 3 or 4 can be in the cell at a time when the label passes right through the cell.

In the absence of labels in the cell, or if the region of the label comprised in the cell does not have a metallic wire, a large proportion of the energy radiated in the form of high-frequency electromagnetic waves by the aerial 8 is absorbed by the lining of the cell, and the aerial 8 only picks up a very faint signal in return. On the other hand, if a wire 3 is inside the cell, the electromagnetic field gives rise to eddy currents in the wire which transmits afresh, and the aerial will pick up a different signal which will be directed by the directional coupler 9 towards the detector 10. Thus the presence or the absence of a metallic wire in the region in question of the label can be revealed. But in addition, the intensity of the reflected energy will vary directly with the intensity of the eddy currents, this intensity being in turn inversely dependent on the resistivity of the metal used.

By measuring the reflected energy, equivalent to a measure of impedance in the whole of the system, or by reference to measurements made with reference standardization wires, the nature of the wire can be identified. It will be seen that if code values 1, 2 and 3, respectively, are given to the three gradations of wire cited above, the code 123 here previously attributed to the label 1 could thus be detected. The previous marking of a label by means of m wires selected from a range of specimens of n types of different resistivity, would therefore enable $n^m$ combinations to be composed.

Figure 3:
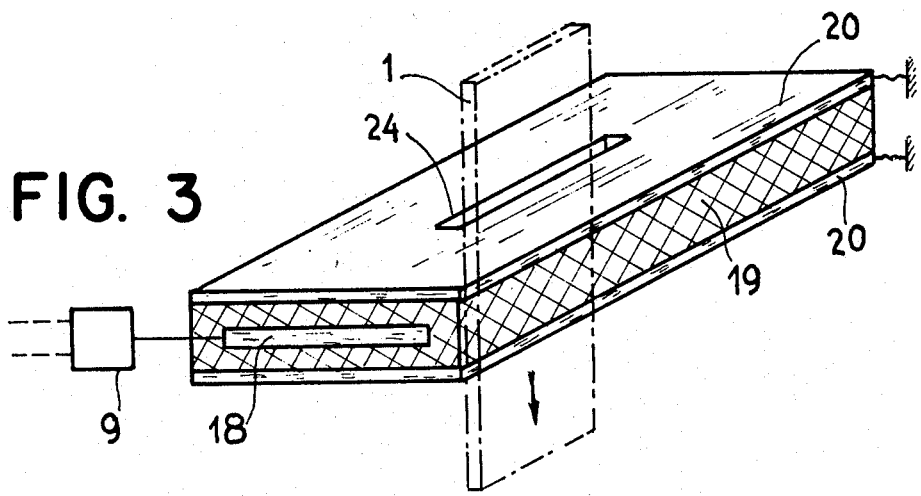
FIGS. 3 and 4 show diagrams of detection cells using a three-plate system. The device of FIG. 3 is designed to analyze the label passing through the plates perpendicularly.
Figure 4:
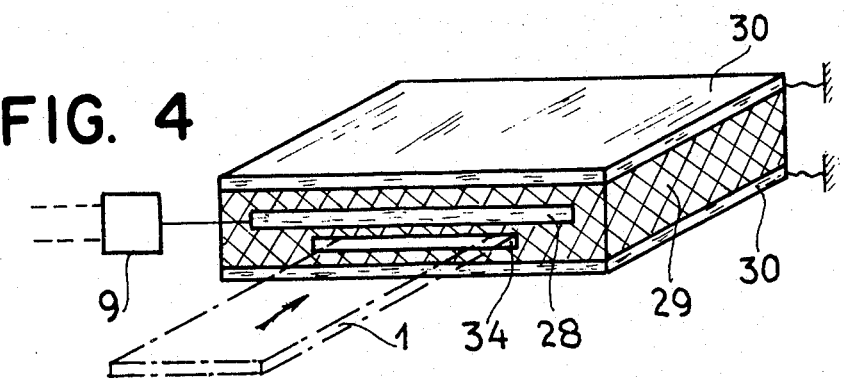

FIGS. 3 and 4 show modified detection cells. In both cases, the high-frequency field is localized in the dielectric 19 (or 29) between a central plate 18 (or 28) and the outside plates 20 (or 30).

In the case of FIG. 3, the block thus formed is pierced by a slot 24 permitting the passage of a label 1 through the plates and the dielectric. In the case of FIG. 4, the label is displaced parallel to the plates, in a slot 34 formed entirely in the dielectric. Of course, the relative dimensions of the label and the cell are again selected here in such a manner that a single wire at a time can appear between the plates.

The coding power could also be increased without recourse to an increased number of gradations of metals or of alloys of sufficiently different electric resistivity to permit detection without ambiguity.

For example, it would be possible to use heterogeneous wires consisting of a core of a certain gradation, surrounded by a plating of a different gradation; it is known at present how to obtain such wires easily. The detection would then be effected by using successively or simultaneously the passage through two high-frequency electromagnetic fields, but with different frequencies, for example 3000 and 9000 MHz. The phenomenon of variable penetration, decreasing with the frequency, of electromagnetic waves in a conducting medium is known, the phenomenon being known as "skin effect". Thus a wire with a core of nickel of resistivity 7.2 $\mu\Omega$cm, plates with an external region of iron-nickel alloy of resistivity 63, will offer the same response signal as a homogeneous wire of iron-nickel if the frequency is sufficiently high for only the external peripheral portion of the wire to be effected by the induced currents; on the other hand, at a lower frequency, the responses will be different.

Here, therefore, an additional means of identification is introduced by effecting the comparisons of the responses twice, at different frequencies, with those produced by reference standard wires. Such operations could also be carried out by causing the frequencies to vary continuously in a given range instead of being limited to two fixed frequencies.

Still with a view to increasing the coding capacity, the behavior of one and the same wire in a high-frequency electromagnetic field could also be caused to vary. For example, by subjecting the wire to a magnetic polarization at the same time as the electromagnetic field, its permeability and the depth of penetration of the waves would be modified, leading to a modification in the responses. The comparison of the responses, with or without polarization in a field of fixed frequency, or in fields of different frequencies, would constitute a fresh means of identification.

The permeability of the wire could also be modified by raising its temperature during the measurement, just above its Curie point.

Naturally, the invention is not limited to the forms of embodiment described by way of example, but it also covers the embodiments which only differ in details, in modifications of execution or in the use of equivalent means. Thus what is important is the relative movement of the label and the detection cell so that each wire is analyzed separately, so that it would be possible to image causing the cell to be displaced in front of or round the fixed label.

I claim:

1. A method for identifying a non-metallic object, said object having a plurality of conductive members attached thereto, each of said members having a conductivity which form a unique code for said object, comprising:

successively subjecting each of said members on said object to an alternating electromagnetic field whereby a current is successively induced in each of said members;

detecting the intensity of a radiation component resulting from each of said members carrying a current induced by said field, said radiation component being distinctive of a radiating member; and recording each of said responses whereby a visual identification of said radiation components is provided identifying said object.

2. The method of claim 1 wherein said members are wires having a resistivity which varies along their length.

3. The new method of claim 2 wherein said electromagnetic field comprises first and second alternating fields having different frequencies.

4. The method of claim 2 wherein said electromagnetic field frequency is varied while each of said wires receives an induced current.

5. A method as claimed in any one of the claims 2, 3, or 4 wherein the regions containing the wires are further subjected to a magnetic polarization.

6. A method as claimed in any one of the claims 2, 3, or 4 wherein the wires while subject to said electromagnetic field are further subjected to heating above the Curie point.

7. The method of claim 2 wherein said wires are plated with different metals.

8. A method for identifying a non-metallic object, said object including a plurality of conductive members, located apart from each other and having conductivity forming a unique code comprising:

passing said object through an anechoic chamber at a constant orientation, said chamber having an entrance opening and exit opening for said object to pass;

radiating said object as it passes through said chamber with a varying electromagnetic field, whereby each of said members successively receives an inducing current, and detecting the intensity of a radiation component emitted by each of said members as said object passes through said chamber whereby said individual components form a unique code for said object.

* * * * *